United States Patent
Elsasser et al.

(10) Patent No.: US 9,249,992 B2
(45) Date of Patent: Feb. 2, 2016

(54) SOLAR RECEIVER SUPPORT STRUCTURE

(75) Inventors: Urs Elsasser, Uster (CH); Thierry Meresse, Lausanne (CH)

(73) Assignee: NOVATON ERNEUERBARE ENERGIEN AG, Zurich (CH)

( * ) Notice: Subject to any disclaimer, the term of this patent is extended or adjusted under 35 U.S.C. 154(b) by 530 days.

(21) Appl. No.: 13/698,062

(22) PCT Filed: May 16, 2011

(86) PCT No.: PCT/EP2011/057831
§ 371 (c)(1),
(2), (4) Date: Nov. 15, 2012

(87) PCT Pub. No.: WO2011/144551
PCT Pub. Date: Nov. 24, 2011

(65) Prior Publication Data
US 2013/0056001 A1    Mar. 7, 2013

Related U.S. Application Data (60) Provisional application No. 61/345,240, filed on May 17, 2010.

(51) Int. Cl.
*F24J 2/10* (2006.01)
*F24J 2/14* (2006.01)
*F24J 2/12* (2006.01)

(52) U.S. Cl.
CPC ..... *F24J 2/14* (2013.01); *F24J 2/12* (2013.01); *F24J 2/125* (2013.01); *F24J 2002/1014* (2013.01); *F24J 2002/1023* (2013.01); *Y02E 10/45* (2013.01)

(58) Field of Classification Search
CPC ..................... F24J 2/12; F24J 2/125
USPC ........................................... 126/696
See application file for complete search history.

(56) References Cited

U.S. PATENT DOCUMENTS 5,358,189 A * 10/1994 Vandermolen .................. 241/92
5,986,726 A * 11/1999 Murai ............................ 349/59
(Continued)

FOREIGN PATENT DOCUMENTS

| DE | 103 35 214 | 3/2005 |
|----|------------|--------|
| DE | 20 2009 005056 | 10/2009 |

(Continued)

OTHER PUBLICATIONS

International Search Report dated Nov. 4, 2011, corresponding to PCT/EP2011/057831.

*Primary Examiner* — Kenneth Rinehart
*Assistant Examiner* — Gajanan M Prabhu
(74) *Attorney, Agent, or Firm* — Young & Thompson (57) ABSTRACT

Process for manufacturing a support structure and a solar receiver includes the following steps:
a) providing a sheet of rigid material having a rectangular shape with a first median axis and a second median axis;
b) performing two grooves running from one sheet side to the opposite side, defining two parabolic curves, the parabolic curves having the same axes of symmetry, parallel to the second median axis, the grooves dividing the sheet in a central surface, a first and a second lateral surfaces;
c) bending the first lateral surface out of plane with respect to the central surface through an angle $\theta 1$ along the first groove; bending the second lateral surface out of plane with respect to the central surface through an angle $\theta 2$ along the second groove; the central surface, first and second lateral surfaces being curved and the central surface having a profile defining a third parabolic curve.

12 Claims, 11 Drawing Sheets

(56) References Cited

U.S. PATENT DOCUMENTS

2002/0184936 A1* 12/2002 Gitlin et al. .................. 72/379.2
2009/0260621 A1* 10/2009 Soucy ........................... 126/600

FOREIGN PATENT DOCUMENTS

| DE | 20 2009 016269 | 3/2010 |
| WO | 2010/039035 | 4/2010 |

* cited by examiner

SOLAR RECEIVER SUPPORT STRUCTURE

TECHNICAL FIELD

The present invention relates to a method for easy manufacturing of inexpensive high quality solar troughs. It also relates to the arrangement of the above mentioned solar troughs in series in order to maximize the amount of energy produced.

STATE OF THE ART

During the next decades, large scale generation of sustainable energy will become one of the main challenges of our civilization. The challenge is underlined both by the ongoing depletion of fossil fuels (coal, oil and gas) as well as the global warming due to increased amount of $CO_2$ in the air, $CO_2$ being an unavoidable by-product of energy generation through fossil fuels. Among the many renewable energy alternatives, solar energy currently offers the most potential.

Today, three main classes of solar energy systems are used:
Photovoltaic panels (PV panels),
Thermo-solar collectors,
Concentrated Solar Power systems (CSP).

PV panels are expensive and the efficiency of their energy conversion is still quite low, but on the other hand PV panels can directly provide electricity without intermediate conversion. Thermo-solar collectors heat up liquids (essentially water) at temperatures that rarely exceed 90° C. A large quantity of liquid is contained in the tubes. The thermal inertia of thermo-solar collectors is therefore quite high and makes them slow to heat up. For this reason, they are mostly used for domestic warm water supply. They can also be used for preheating water which is later brought to higher temperatures with other means. Thermo-solar collectors are therefore not used for bulk energy generation and/or for electricity generation.

On the other hand, Concentrated Solar Power (CSP) are very suitable for large scale applications such as solar power plants. These systems are arranged to focus sunlight onto a smaller area in order to produce electricity either through high-efficiency photovoltaic cells (Concentrated Photovoltaics), or through heat carried by a transfer fluid in a tube (essentially water) or by air in a Stirling engine.

CSP includes systems as diverse as solar troughs, solar dishes and solar towers.

Most large scale solar power plants use solar troughs and provide energy at a cost per kWh still significantly higher than conventional fossil energy sources. One main reason is the manufacturing cost of the solar troughs induced by the precise shapes to be obtained. Another reason is the cost of the sun tracking equipment to follow the sun. Such equipment generally comprises expensive optoelectronic systems and electromechanical actuators. Finally, a third reason is the need for large ground areas between troughs to compensate for the shadowing effect when the sun is at a low elevation. Conversely, when the sun elevation is high (sun close to the zenith), these areas are hit by solar rays lost to the CSP.

Most CSP systems use parabolic-shaped reflective troughs arranged to follow the elevation of the sun during daylight and to concentrate the incident rays onto the receiving tubes located along the trough's focal line. The tube contains a fluid (water for example) heated by the reflected sun rays. The resulting hot water (or steam, depending on the pressure and temperature) can be used for heating, cooling (with a chiller), desalination of salted water, or electricity generation through a steam turbine and an electrical generator.

The first requirement for a solar trough is to follow an accurate shape. Defects of curvature influence the position of the focal point. Therefore these defects reduce the efficiency of the solar receiver when the tubes are misaligned with the focal lines. In general, the troughs' shapes are parabolic. Non-parabolic troughs also exist such as circular troughs which are less sensitive to the sun's elevation although they concentrate the sun on a slightly more diffuse and vertical area. In the current state of the art, the shape and the structural stability of the trough is usually obtained with structural frameworks involving ribs and stiffeners. A large number of ribs and stiffeners are needed in order to obtain the exact desired shape and to resist to the wind force. In addition to this, the way the reflective sheet is attached to the ribs and stiffeners is not straightforward. It can be done, among other solutions, with screws, rivets or glue. This leads to significant local stress on the reflective sheet and, hence, to optical inaccuracies.

A second requirement for a solar trough is to achieve a low manufacturing cost for mass production in order to reach a competitive cost per kWh compared to conventional energy sources. This requirement is difficult to achieve with current systems as reflective sheets, ribs and stiffeners are expensive to produce and to mount.

Attempts have been made to reduce the costs of the troughs by using honeycomb panels or by molding the whole trough in one piece or in two halves. Still the resulting shape of the trough often lacks accuracy and the manufacturing process requires expensive and complex equipment.

The present invention aims to solve the above mentioned problems.

The present invention and the corresponding advantages and features provided thereby will be best understood and appreciated upon review of the following detailed description of the invention, taken in conjunction with the following drawings in which.

DESCRIPTION OF THE INVENTION

Figure 1:
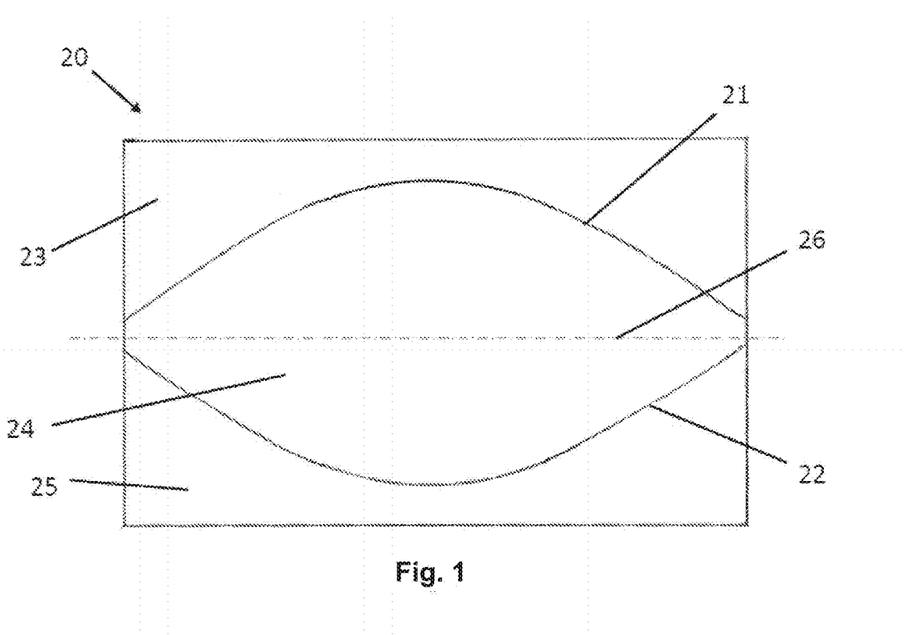
FIG. 1 shows a flat sheet to become the support structure of a trough, according to the invention.
Figure 2:
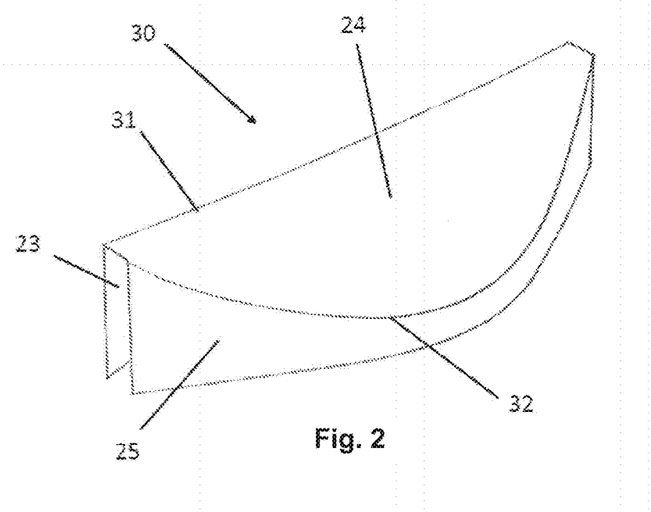
FIG. 2 is a perspective view of a support structure according to the invention.
Figure 6:
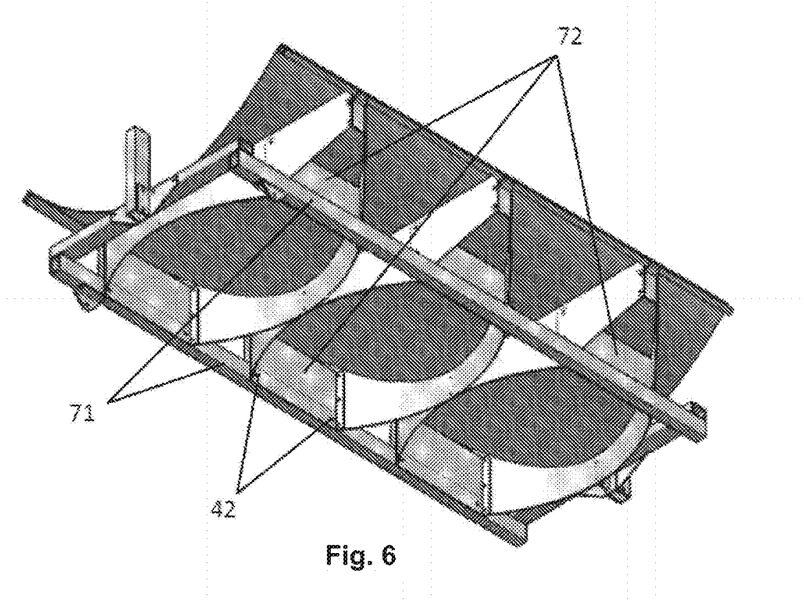
FIG. 6 is a perspective view of a solar receiver comprising a flexible reflective sheet mounted over three support structures.
Figure 19:
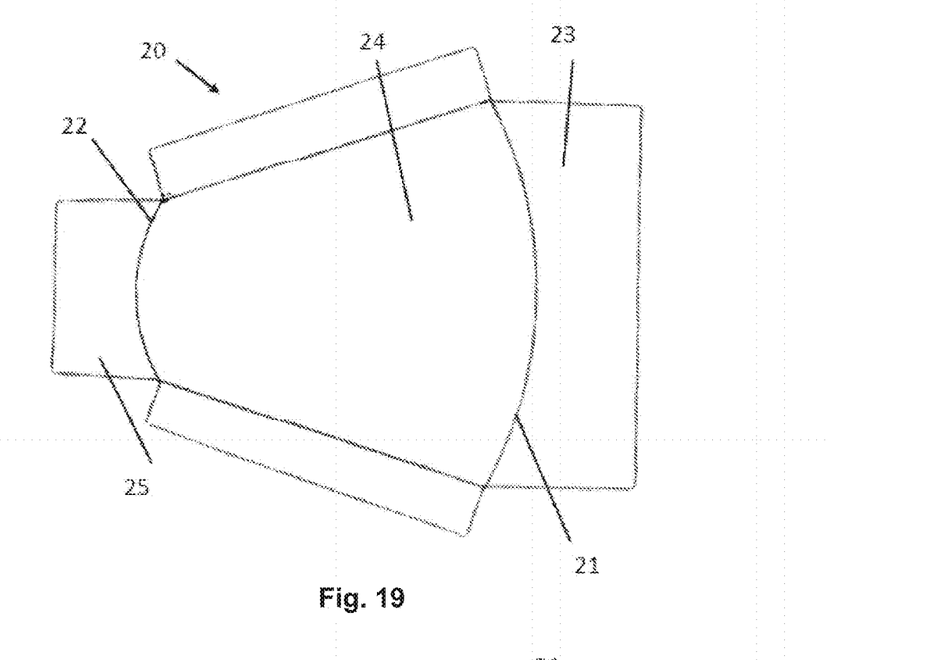
FIG. 19 is a view of a flexible reflective sheet to become trough.
Figure 20:
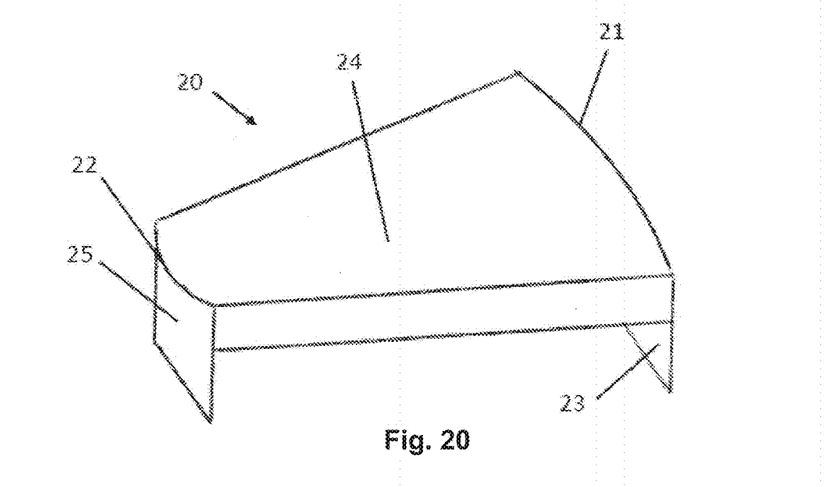
FIG. 20 is a flexible reflective trough with a triangular shape that can be used to build solar dishes or other concentrated solar equipment.

The present invention relates to a manufacturing process of a support structure for a solar receiver (solar trough) according to the following steps.
- a) Providing a flat sheet of material 20 with a definite shape. It can be rectangular shape as in FIG. 1, or any other shapes as in FIGS. 3 and 19.
- b) Performing on the flat sheet a first groove 21 along a definite curve running from one side of the sheet to the opposite side of the sheet, a second groove 22 along another definite curve running from one side of the sheet to the opposite side of the sheet. The grooves divide the sheet in three surfaces: a central surface 24 and first and second lateral surfaces 23 and 25. Both grooves are arranged so that they do not intersect. Each groove is respectively etched or milled on one side of the sheet, without traversing it. According to the material and its rigidity, the deepness of the groove is determined by a skilled person so that the sheet does not risk being broken during the manufacturing process or later.
- c) Bending the first lateral surface 23 of the sheet with respect to the central surface 24 and the first groove 21. The first groove 21 will define the first edge 31 of the support structure. The bending angle θ1 can be 90° as in FIG. 2 or it can be an angle different from 90°. Moreover, the angle θ1 can actually vary along the groove 21. It can also advantageously be adjustable with a mechanism as it will be explained hereafter.
- d) Bending the second lateral surface 25 of the sheet with respect to the central surface 24 and the second groove 22. The second groove will define the second edge 32 of the support structure. The bending angle θ2 can be 90° as in FIG. 2 or it can be a different angle. Likewise, the angle θ2 can vary along groove 22. It can equally be adjustable with a mechanism. The central surface 24 as well as the first and the second lateral surfaces 23 and 25 form accurate three-dimensional geometrical surfaces that depend on the shapes of the first and the second grooves as well as the bending angles θ1 and θ2. If both grooves are symmetrical along a central line 26, the central surface 24 can be used has an accurate profile supporting the flexible reflective sheets that will make up the solar trough such as in FIG. 6 showing an example of a solar trough using three such supports. It should be noted that the support structure with a parabolic shape are obtained from grooves made on a flat surface as in FIG. 1 or in FIG. 3 that are not parabolic curves.

Mode(S) For Carrying Out The Invention

Figure 3:
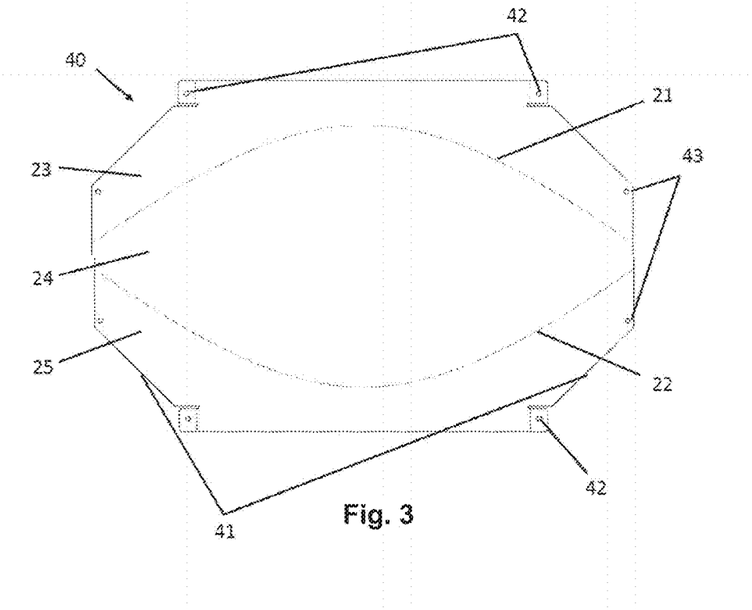
FIG. 3 is a view of a flat sheet to become a support structure according to the invention.
Figure 4:
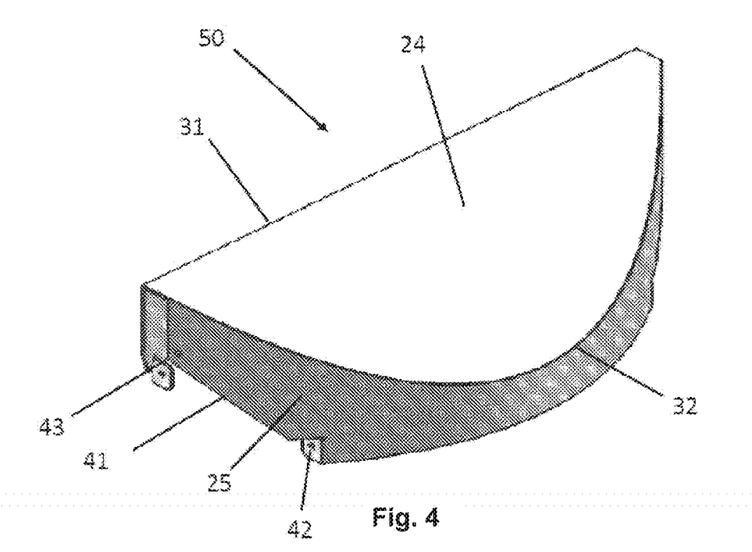
FIG. 4 is a perspective view of a support structure according to the invention.
Figure 5:
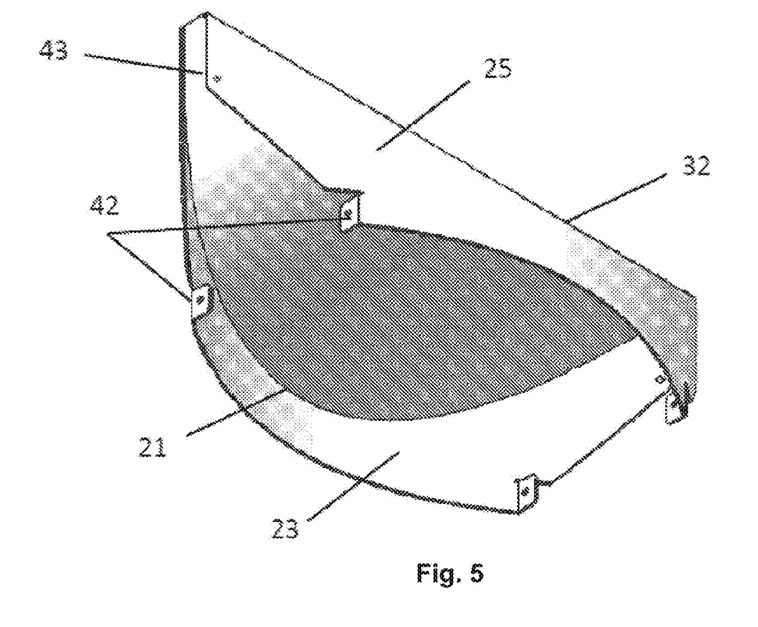
FIG. 5 is a perspective view seen from underneath of a support structure according to the invention.
Figure 7:
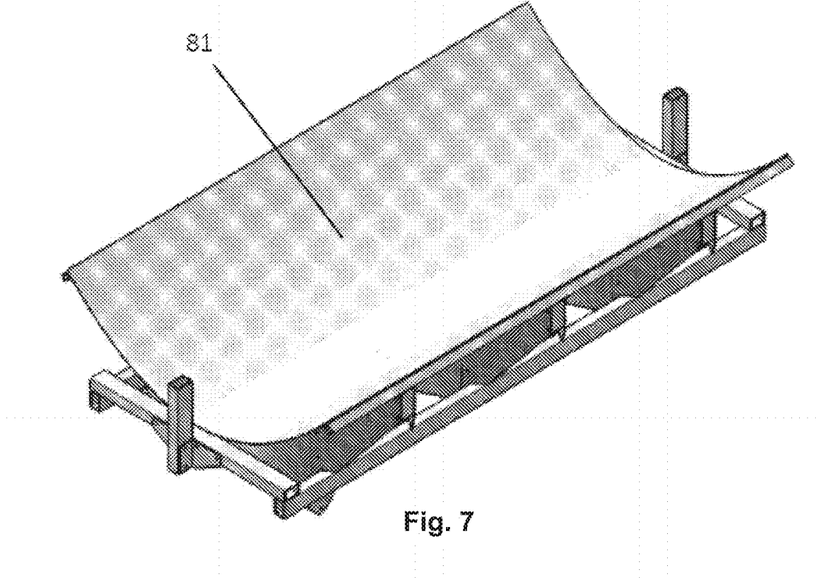
FIG. 7 is a perspective view of a solar receiver seen from above.
Figure 8:
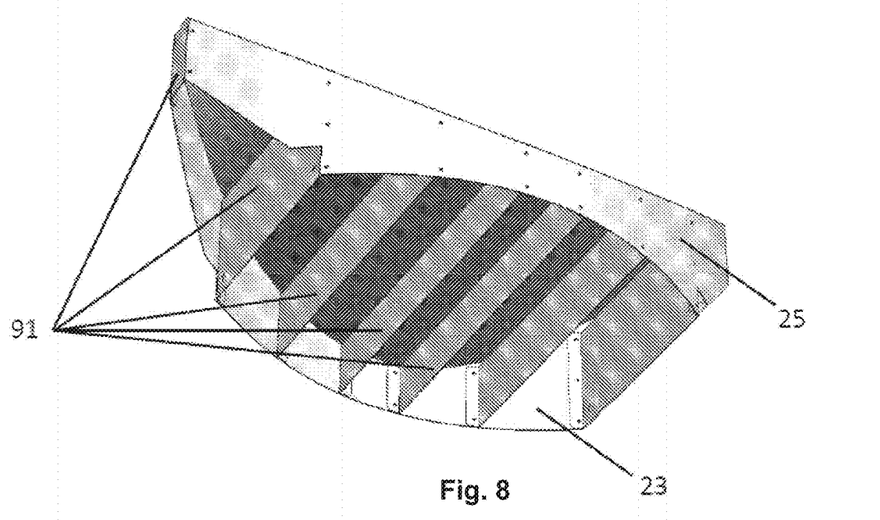
FIG. 8 shows a perspective view seen from underneath of a support structure with its stiffening means.
Figure 9:
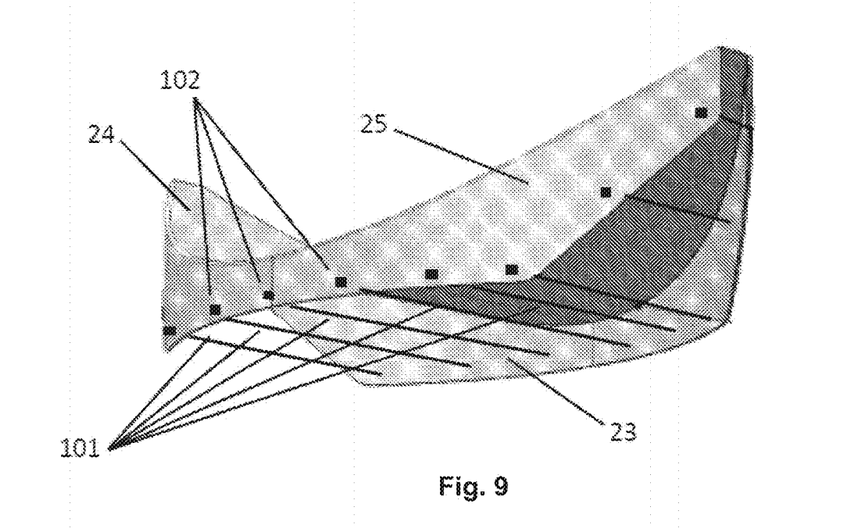
FIG. 9 shows the support structure strings.

The manufacturing process can further comprise the step of truncating the sheet corners 41 as shown in FIG. 3 and FIG. 4. This yields a lighter yet rigid support structure taking less volume. Another step in the manufacturing process may include the stiffening of the support structure. As shown in FIG. 6, two transversal ribs 71 can be attached to the mounting supports 42 on which holes are drilled. This enables a proper alignment of the supports structures 50 before attaching the flexible reflective sheet 81 as in FIG. 7. A preferred attachment method of the flexible reflective sheet is through gluing of the flexible reflective sheet to the area 24 of the support structure. The wide area 24 enables a very stable and rigid gluing of the flexible reflective sheet which is superior to the current state of the art through ribs and stiffeners attached with screws or rivets. It must be noted that in order to strengthen the support structure, stiffening ribs 72, 91 as FIGS. 6 and 8 can be bolted to holes drilled in the lateral surfaces 23 and 25. Contrary to most of the ribs used for solar receivers in the state of the art, these ribs are not required to have accurate shapes and are therefore cheaper to manufacture. Alternatively, holes 43 as in FIG. 5 can be drilled to attach cables or strings to rigidify the support structure as surfaces 23 and 25 tend to spread. Other means, accessible to a person skilled in the art, could be applied to achieve similar results. Additionally, a mechanism with pulleys can advantageously be used to change the length of the strings change the shape 24 and to adjust the focal point of the resulting trough.

Aluminium is well suited for this manufacturing process. A sandwich material with two external sides of aluminum and a layer of epoxy in between is preferred.

The materials previously described as well as any other materials that a skilled person would find appropriate for that purpose, are low cost and easily etched or milled. Additionally, they are flexible and bend with no difficulty. They offer durability and high strength-to-weight ratio.

Figure 10:
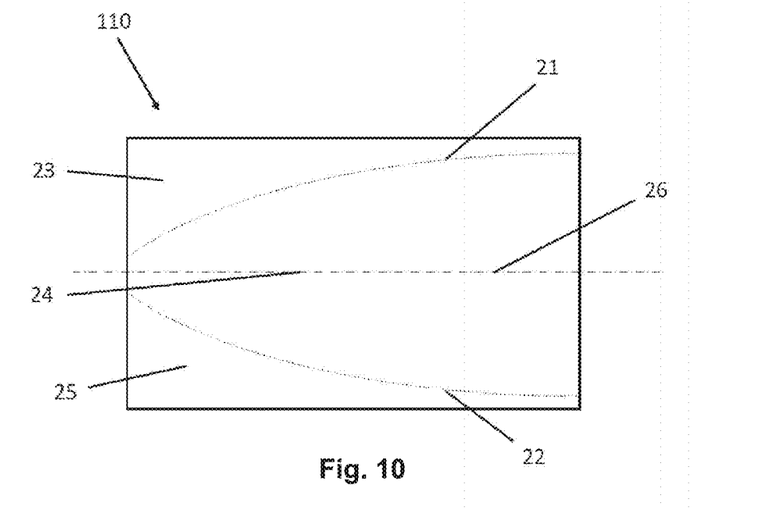
FIG. 10 is a view of a flat sheet to become a support structure according to the invention.
Figure 11:
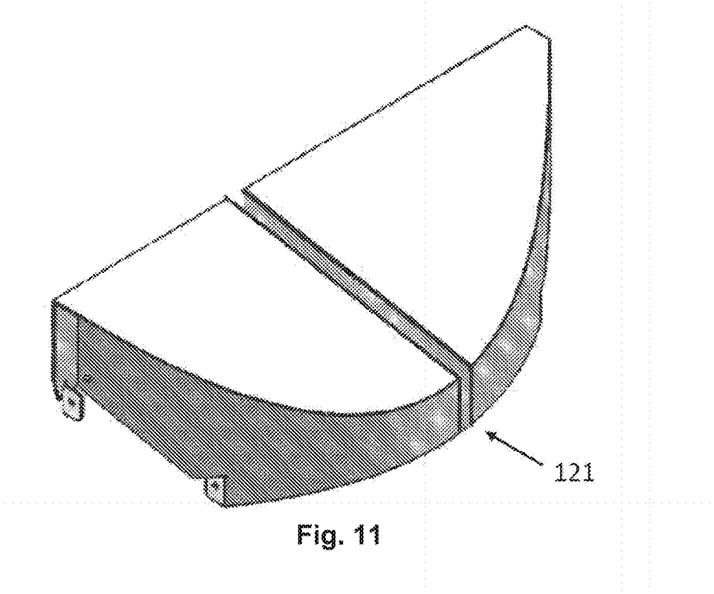
FIG. 11 is a perspective view of a combination of two structures comprising a gutter.
Figure 12:
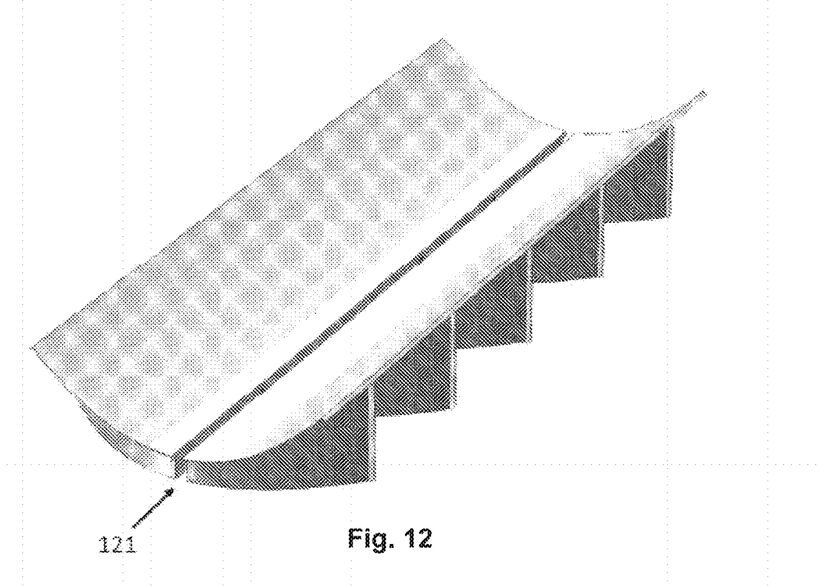
FIG. 12 is a solar trough made of ten combined support structures holding a flexible reflective sheet and comprising a gutter.

Another embodiment of the present invention is shown in FIG. 10 where the initial sheet 110 presents also two grooves 21 and 22. Their axe of symmetry is line 26. The resulting solar receiver as shown in FIG. 11 is two half-support structures combined and spaced to form a gutter. Advantageously, this gutter 121 allows the parabolic trough to be cleaned by a natural process: dust and rainwater would run down the parabolic profile and be disposed of in the gutter. The additional effect is to lower the costs of maintenance. Moreover, it has no performance penalty as the gutter is arranged under the cast shadow of the receiver tube. Another advantage, compared with the previous embodiment, is that, given the same manufacturing equipment handling the same rigid sheets, it is possible to build solar receivers about twice as big. In the subsequent embodiments of the present invention, one shall always consider that a solar receiver can be obtained from one single structure or from the combination of two or more structures comprising a gutter.

Figure 13:
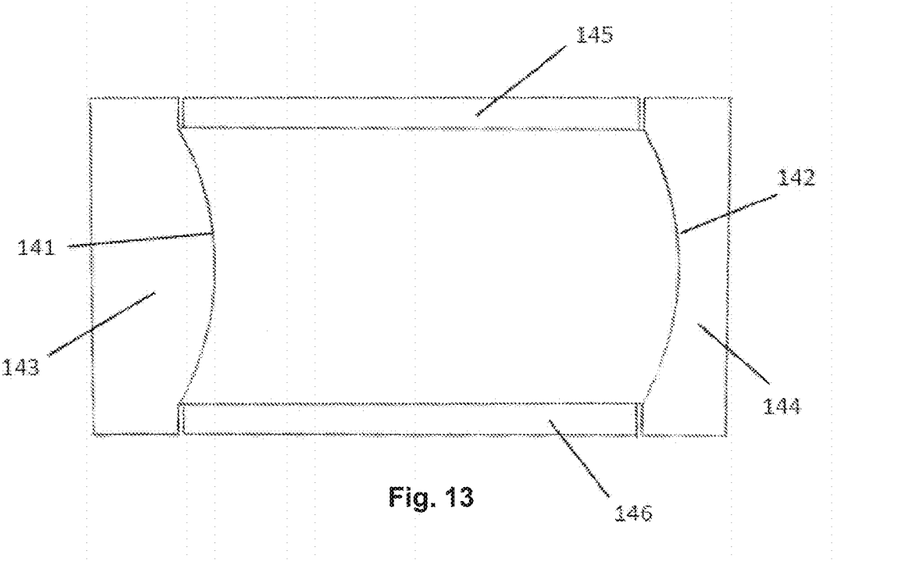
FIG. 13 is a view of a flat flexible reflective sheet to become a trough.
Figure 14:
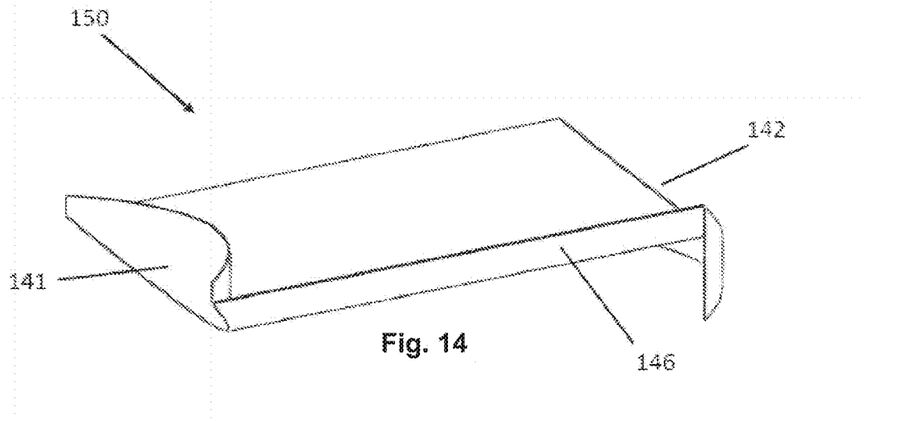
FIG. 14 is a perspective view of a solar trough made of a single flexible reflective sheet with a concave and a convex edge.

FIGS. 13 and 14 show another embodiment of a solar receiver according to the invention. It comprises concave and convex edges obtained from a first and a second groove 141, 142. The first lateral surface 143 is bent upward and the second lateral surface 144 is bent downward. The advantage to use such a solar receiver 150 will be later apparent. It can be further noticed that the solar receiver 150 includes additional stiffening means 145, 146.

Figure 15:
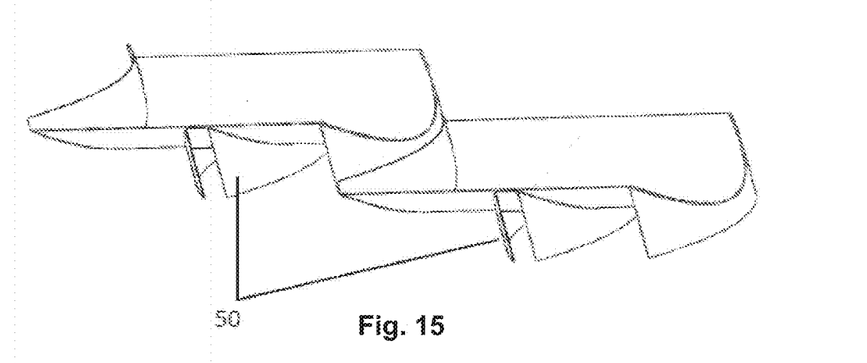
FIG. 15 is perspective view of two solar receivers.
Figure 16:
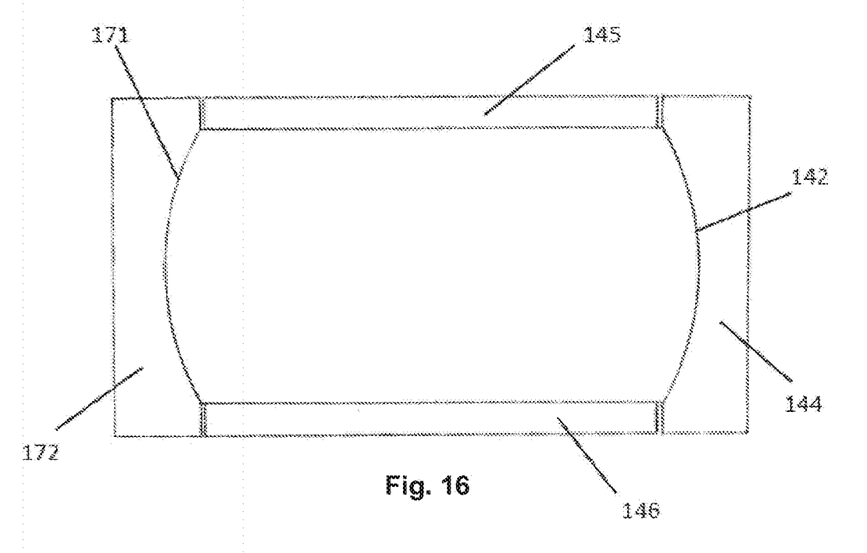
FIG. 16 is a view of a flat reflective sheet to become a trough.
Figure 17:
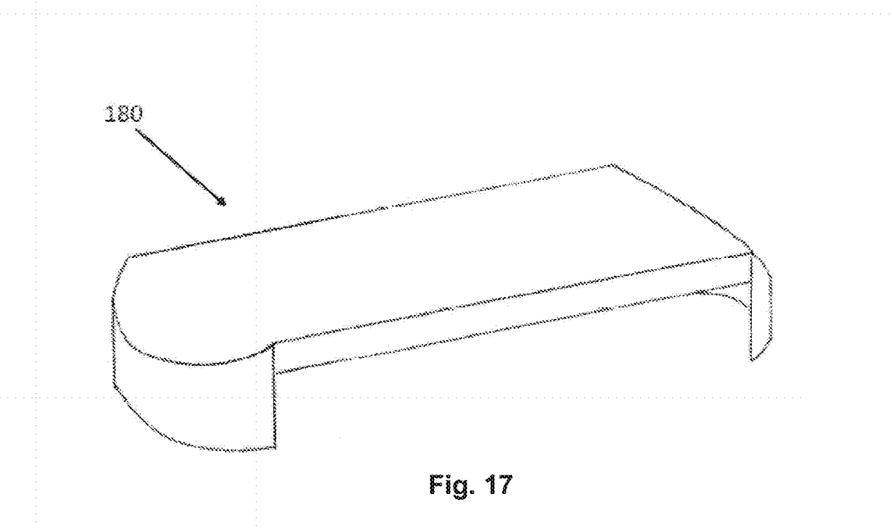
FIG. 17 is a solar trough made of a single flexible reflective sheet.

Another object of the present invention is shown in FIG. 15. It involves a set of solar receivers 150 supported by support structure 50 (two in this drawing, but it can be more. This configuration has many advantages. When the focal lines are aligned with the sun azimuth, and the set is tilted with respect to the sun's mean position, a highly effective optical coupling takes place from one solar receiver to the next even for small incident solar angles, yielding very high energy efficiency. The concave and convex edges are here particularly advantageous. The staircase arrangement of the solar receivers ensures that an incident beam is either reflected from one solar receiver to its focal line or further reflected onto the next solar receiver and eventually to another focal line. Moreover, the cast shadow is also accounted for by the staircase arrangement, resulting in an improved use factor of the area. Additionally, for a given energy production, the overall height of such set of solar receivers remains quite low in comparison to the state of the art solar receivers. Therefore the mechanical structure can be lighter and less expensive to manufacture.

Another aspect of the present invention is to obtain a solar receiver by carrying out the manufacturing process as previously described with a sheet of rigid material chosen to have a reflective surface. Alternatively, the sheet can have no reflective surface, but the process comprises an additional step consisting in a treatment applied to the sheet to produce a reflective surface. As a result, the parabolic profile defines a focal line along which a receiver tube can be installed. A solar receiver is therefore obtained with a precise parabolic profile or parabolic trough's shape.

Figure 18:
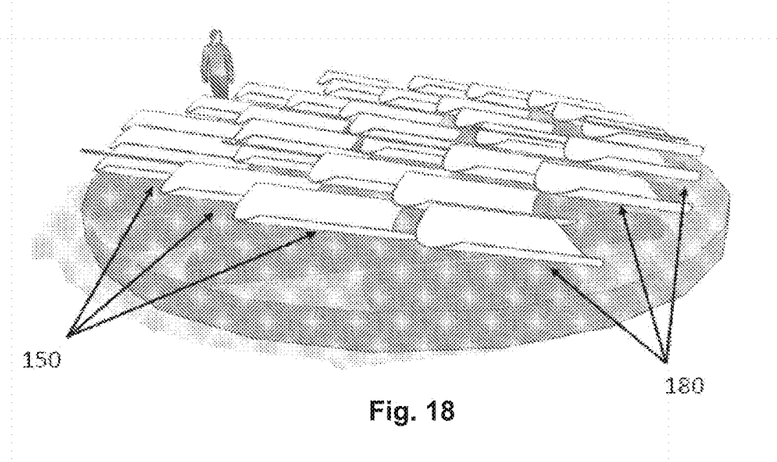
FIG. 18 is perspective view of a solar power plant made of a plurality of solar troughs.

An additional aspect of the invention relates to a further arrangement of such solar receivers 150 and 180 to yield solar power plants. Solar power plants using a plurality of sets of solar receivers are another object of the invention. FIG. 18 shows a solar power plant according to the invention. Sets of solar receivers are arranged so that their vertical plans are parallel. They can be mounted on a Solar Island, which is an artificial circular island of potentially large dimensions. It consists of an outer torus wrapped in a membrane, on which the sets of solar receivers are mounted. The island is able to rotate in order to follow the sun azimuth movement. Thus, the solar receivers are precisely aligned to the sun. This avoids fitting the concentrating solar receivers with dedicated and expensive sun tracking systems. In order to optimize the use factor of the area, individual solar receivers are also used. They are arranged so that their focal lines are parallel to the sets vertical plans. A solar power plant is therefore obtained with a limited height, which meets the requirements of local building regulations, high efficiency and increased power production for a given area. The cost factors to manufacture and maintain the power plant are also reduced and the cost per kWh becomes competitive against fossil energy sources.

The invention claimed is:

1. A manufacturing process of a set of solar receivers, comprising the steps of:
   forming a support structure by the sub-steps of
   providing a first sheet of rigid material,
   providing on said first sheet, a first support groove and a second support groove that do not intersect, said first and second support grooves dividing said sheet into a central surface, a first lateral surface, and a second lateral surface,
   bending said first sheet so that:
   said first lateral surface is out of plane with respect to said central surface along the first support groove, said first support groove defining a first edge of said support structure,
   said second lateral surface out of plane with respect to said central surface along the second support groove, said second support groove defining a second edge of said support structure,
   wherein said central surface, said first lateral surface, and said second lateral surface are curved and said central surface has a profile defining a parabolic curve;
   mounting a first solar receiver over the central surface; and
   mounting at least a second solar receiver over the central surface, wherein,
   said first solar receiver has a first groove that defines a convex first edge with a first lateral surface bent downward, a second groove that defines a convex second edge with a second lateral surface bent downward,
   said second solar receiver has a first groove that defines a concave first edge with a first lateral surface bent upward, a second groove that defines a convex second edge with a second lateral surface bent downward, and
   said second lateral surface of said first solar receiver is fixed to said first lateral surface of said second solar receiver, said first and second receivers having respectively a first and a second focal lines comprised in a vertical plan.

2. The manufacturing process of claim 1, further comprising a step of truncating corners of said first sheet.

3. The manufacturing process of claim 2, further comprising a step of stiffening the support structure by applying stiffening elements to said first lateral surface, and said second lateral surface.

4. The manufacturing process of claim 3, wherein said stiffening elements comprise stiffening ribs.

5. The manufacturing process of claim 3, wherein said stiffening elements comprise cables or strings attached to drilled holes in the first and second lateral surfaces.

6. A set of solar receivers comprising:
   a support structure for a solar receiver comprised of a sheet of rigid material, said first sheet having a first support groove and a second support groove that do not intersect, said first and second support grooves dividing said sheet in a central surface, a first and a second lateral surfaces, said first sheet being bent with
   i) said first lateral surface out of plane with respect to said central surface along the first support groove, said first support groove defining a first edge of said support structure,
   ii) said second lateral surface out of plane with respect to said central surface along the second support groove, said second support groove defining a second edge of said support structure, and
   iii) wherein said central surface, said first lateral surface, and said second lateral surface are curved with said central surface having a profile defining a parabolic curve,
   a first solar receiver mounted over the central surface; and
   at least a second solar receiver mounted over the central surface, wherein,
   said first solar receiver has a first groove that defines a convex first edge with a first lateral surface bent downward, a second groove that defines a convex second edge with a second lateral surface bent downward,
   said second solar receiver has a first groove that defines a concave first edge with a first lateral surface bent upward, a second groove that defines a convex second edge with a second lateral surface bent downward, and
   said second lateral surface of said first solar receiver is fixed to said first lateral surface of said second solar receiver, said first and second receivers having respectively a first and a second focal lines comprised in a vertical plan.

7. A solar power plant comprising a plurality of sets of solar receivers according to claim 6, arranged so that said vertical plans of each set are parallel.

8. The set of solar receivers of claim 6, further comprising stiffening elements that stiffen said first lateral surface, and said second lateral surfaces.

9. The set of solar receivers of claim 8, wherein said stiffening elements comprise stiffening ribs extending between said first and second lateral surfaces.

10. The set of solar receivers of claim 8, wherein said stiffening elements comprise cables or strings attached to drilled holes in the first and second lateral surfaces and extending between said first and second lateral surfaces.

11. The set of solar receivers of claim 9, wherein each of said first and second lateral surfaces has truncated corners.

12. The set of solar receivers of claim 10, wherein each of said first and second lateral surfaces has truncated corners.

* * * * *